United States Patent [19]

Friederich et al.

[11] Patent Number: 5,377,713
[45] Date of Patent: Jan. 3, 1995

[54] VALVE

[75] Inventors: Kilian Friederich, Plochingen; Winfried Michell, Reichenbach; Diedrich von Behr, Hochdorf, all of Germany

[73] Assignee: Cerasiv GmbH Innovatives Keramik-Engineering, Plochingen, Germany

[21] Appl. No.: 119,099

[22] Filed: Sep. 17, 1993

[30] Foreign Application Priority Data

Mar. 18, 1991 [DE] Germany .................. 4108732

[51] Int. Cl.[6] .............................. E03B 1/00
[52] U.S. Cl. ............................ 137/1; 251/368
[58] Field of Search ................ 251/368; 137/1

[56] References Cited

U.S. PATENT DOCUMENTS

| | | | |
|---|---|---|---|
| 4,004,776 | 1/1977 | Stender | 251/368 |
| 4,847,166 | 7/1989 | Kaido et al. | 251/368 |
| 4,856,758 | 8/1989 | Knapp | 251/368 |
| 4,932,438 | 6/1990 | Kitamura et al. | 251/368 |
| 4,971,112 | 11/1990 | Knapp | 251/368 |
| 5,100,565 | 3/1992 | Fujiwara et al. | 251/368 |
| 5,127,430 | 7/1992 | Powers et al. | 251/368 |

FOREIGN PATENT DOCUMENTS

| | | |
|---|---|---|
| 0043456 | 1/1982 | European Pat. Off. . |
| 0063762 | 11/1982 | European Pat. Off. . |
| 2449662 | 4/1975 | Germany . |
| 2624641 | 12/1976 | Germany . |
| 8715044 | 2/1988 | Germany . |
| 3733730 | 10/1988 | Germany . |
| 3829506 | 6/1990 | Germany . |

*Primary Examiner*—A. Michael Chambers
*Attorney, Agent, or Firm*—Felfe & Lynch

[57] ABSTRACT

In a valve the sealing disks in contact with one another consist of sintered silicon carbide ceramic and have on their functional surface a profile bearing percentage of at least 75% established by grinding and/or lapping and/or polishing. The mean roughness at the functional surface amounts to 0.01 to 0.1 μm. The construction is especially suitable for a sanitary mixing faucet.

14 Claims, 2 Drawing Sheets

VALVE

BACKGROUND OF THE INVENTION

The invention relates to a valve, especially a valve of a sanitary mixing faucet with at least two sealing disks of sintered ceramic which are in contact with one another.

Ceramic sealing disks above for use in sanitary mixing faucets are widely used and are described, for example, in EP-A-43 456. According to this disclosure an aluminum oxide having a 3 to 25 wt.-% zirconium dioxide content is proposed as the material. With the known sealing disks a reduction of the displacement forces was already achieved, and despite an exceedingly low profile bearing of 10 to 40% an adequate sealing action could still be achieved.

U.S. Pat. No. 4,856,758 discloses sealing disk combinations (plates) for fittings. According to one embodiment, one of the plates is to consist of silicon carbide and the other of the two plates of a hard material of different properties. Examples of such sealing disk combinations are silicon carbide/aluminum oxide or silicon carbide/aluminum silicate. If silicon carbide is proposed as the material for the formation of two sealing disks in contact with one another, the silicon carbide is to have different properties. The limited teaching of that patent is based on providing, in the case of the sealing disk of lesser hardness a less smooth surface having a plurality of microscopic depressions, so that the bearing surface between the two cooperating plates is greatly reduced. The patent is to be understood in the sense of the formation of a low profile bearing percentage. The silicon carbide materials to be used according to the patent are prepared by infiltration of carbon-containing silicon carbide blanks with metallic silicon—so-called reaction-sintered or re-action-bound silicon carbide.

In DE-C-38 29 506 a valve is described in which the movable valve element and the valve seat element consist of different ceramic materials, the combination of oxidic materials with carbide or nitride materials being mentioned. A disclosure of similar content is found in DE-U-87 15 044 which proposes, for the upper valve part of a sanitary fitting with inlet disk and control disk, the material combination of aluminum oxide and silicon carbide. The silicon carbide material herein proposed is a reaction-sintered silicon carbide (SiC-Si), as already discussed in connection with U.S. Pat. No. 4,856,758. The same material is mentioned for valve disks according to EP-A-63 627 and EP-A-63 762. In the two last-named disclosures an Ra value in the range from 0.1 to 0.15 μm is proposed. The disadvantage of the several times proposed reaction-sintered silicon carbide consists, due to its metallic content, in its low resistance to erosion and corrosion. An additional problem of the known sealing disk combinations in sanitary mixing faucets is that they are required to provide not only an extraordinarily good seal but also very low displacement efforts for their operation. In spite of the many proposals made in the above-described state of the art, it has not yet been possible to reduce the displacement efforts in a satisfactory manner without adding grease as an aid in the assembly of the valve between the sealing disks in contact. It has been found, however, that the grease is gradually flushed out and its effect is lost, with the result that the faucet becomes hard to operate. Moreover, there is an additional disadvantage in the additional production step of greasing.

INVENTION

Figure 1:
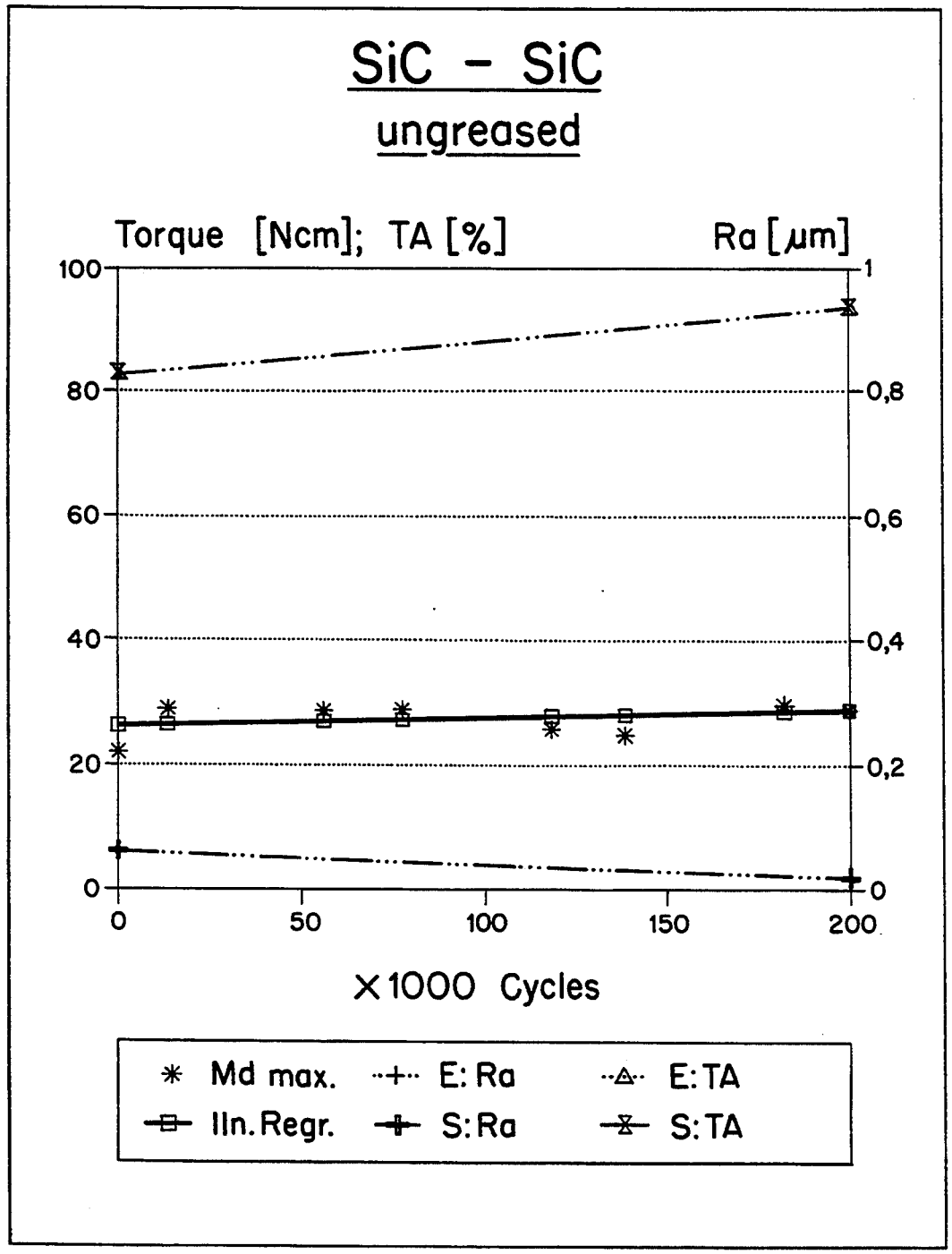
FIG. 1 shows the displacement force required in a combination of the invention over a range of operating cycles.

An object of the present invention is to provide a valve, especially for a sanitary mixing faucet, whose sealing disks requirements has an improved resistance to erosion and corrosion in comparison to sealing disks of silicon carbide containing infiltrated silicon, a low displacement effort and good sealing effect. Additionally, the low displacement effort is to be present not only initially but also after extended period of use.

The achievement of the above-stated object is accomplished in a valve, especially a valve of a sanitary mixing faucet with at least two sealing disks of ceramic in contact with one another, by providing sealing disks in contact with one another which consist of silicon carbide ceramic produced by pressureless sintering, hot pressing, or by pressureless sintering followed by a hot isostatic pressing procedure. The sealing disks have, at each of their functional surfaces, a profile bearing percentage of at least 75% established by grinding and/or lapping and/or polishing. Further the functional surfaces have an average roughness $R_a$ ranging from 0.01 to 0.1 μm.

It shall be understood that "silicon carbide ceramic made by pressure-less sintering, hot pressing, or by pressureless sintering followed by a hot isostatic pressing operation," excludes the silicon carbides, the so-called reaction sintered or reaction bound silicon carbide, produced by infiltration with metallic silicon. Also, neither do those sealing disks which are additionally provided with a coating come under the present invention.

The term, "functional surface," refers to the contact surfaces of the sealing disks. The present invention finds application in valves of sanitary mixing fauces of the conventional form with only two sealing disks, but is not limited thereto and is also useful in those mixing fauces which operate with, for example, three sealing disks.

The silicon carbide itself is not subject matter of the present invention, and in accordance with the invention the sealing disks can consist of silicon carbide materials such as those described, for example, in DE-A-24 49 662, DE-A-26 24 641 or DE-C-37 33 730.

According to an especially preferred embodiment, the functional surfaces of the sealing disks have a mean roughness $R_a$ between 0.05 and 0.1 μm. A mean roughness below 0.05 leads to higher displacement efforts.

In contrast to the reaction sintered silicon carbide materials described in EP-A-63 762 and EP-A-63 627, the silicon carbide ceramics used in an especially preferred embodiment of the present invention have a density $>3.05$ g/cm$^3$. Such silicon carbide ceramics have good mechanical stability, good resistance to chemical influences, and display an especially good resistance to attrition so that, even after comparatively long use, the valve retains its full functionality.

According to another preferred embodiment the sealing disks in contact with one another consist of the same silicon carbide ceramic material. However, there can be slight differences, such as production differences, between two sealing disks in contact with one another, without departing from the scope of the invention. However, the differences between the individual sealing disks in contact with one another are preferably less than a maximum of 0.25 g/cm$^3$, but in that case neither of the sealing disks must have a density of less than 3.05 g/cm$^3$.

In another preferred embodiment of the invention the profile bearing percentage is limited to a maximum of 95%, since it has been found that, after comparatively long use, the profile bearing percentage increases slightly, so that, in the case of sealing disks with an initial profile bearing percentage of more than 95% after a long period of use of the valve the ease of operation, i.e., low displacement and breakloose effort is no longer assured.

While it has often been considered necessary in the prior art practice to place grease between the sealing disks in contact, a further production advantage of the present invention is that such a practice is no longer necessary.

Inasmuch as the sealing disks according to the invention have a Vickers hardness of less than 2,800 (HV 0.5; DIN 50 133), an additional contribution is made to the long useful life of the sealing disk combination according to the invention.

Figure 2:
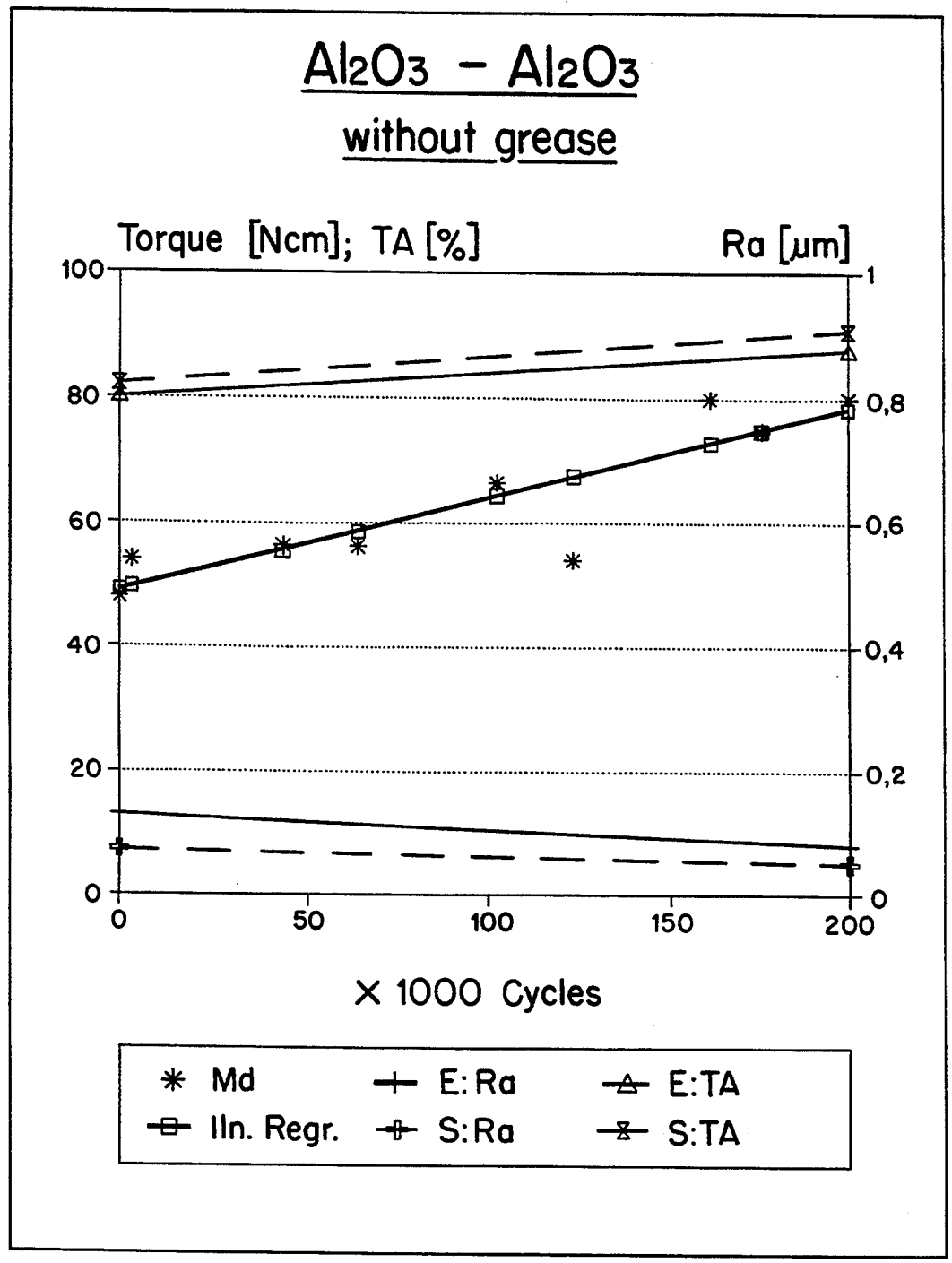
FIG. 2 shows the displacement force required in a combination using unlubricated aluminum oxide sealing disks over the same range of operating cycles.

FIGS. 1 and 2 show the variation of the torque, profile bearing percentage and Ra value after 200,000 operating cycles of a sealing disk combination according to the invention, in which both valve disks are made from a silicon carbide in accordance with DE-C-37 33 730, no grease having been put between the valve disks (FIG. 1), and in the case of the combination of commercial valve plates of aluminum oxide in the ungreased state (FIG. 2).

From the comparison of FIGS. 1 and 2 it can clearly be seen that the displacement efforts—here expressed as torque (Ncm)—in the case of the valve disk combination according to the invention retain the low torque value they had at the beginning, even after 200,000 operating cycles. At the same time the profile bearing percentage increases, while the arithmetical mean roughness Ra increases but slightly.

In contrast, FIG. 2 shows extremely high displacement efforts with the aluminum oxide sealing disks assembled in the unlubricated state.

It will be understood that the specification and examples are illustrative but not limitative of the present invention and that other embodiments within the spirit and scope of the invention will suggest themselves to those skilled in the art.

We claim:

1. A valve with at least two ceramic sealing disks in contact with one another wherein each sealing disk is of a silicon carbide ceramic having a density of at least 3.05 b/cm$^3$ and produced by at least one of a pressureless sintering, hot pressing, or by pressureless sintering followed by a hot isostatic pressing operation, and has a functional surface with a profile bearing percentage of at least 75% and a mean roughness Ra in the range of from 0.01 to 0.1 $\mu$m.

2. The valve of claim 1 wherein the mean roughness Ra is in the range of from 0.05 to 0.1 $\mu$m.

3. The valve of claim 1 wherein each of the sealing disks has a bearing surface percentage of up to 95%.

4. The valve of claim 1 wherein no grease is applied to the functional surfaces of the sealing disks in engagement with one another.

5. The valve of claim 1 wherein each of the sealing disks is comprised of a silicon carbide ceramic having a Vickers Hardness less than 2,800 (HV 0.5; DIN 50 133).

6. The valve of claim 1 wherein the functional surface with a profile bearing percentage of at least 75% is established by at lease one of grinding, lapping or polishing.

7. The valve of claim 1 wherein the sealing disks have a different density from each other.

8. A sanitary mixing faucet with at least two sealing disks of ceramic that are in contact with one another wherein each of the sealing disks is of a silicon carbide ceramic having a density of at least 3.05 g/cm$^3$ produced by at least one of pressureless sintering, hot pressing, or by pressureless sintering followed by a hot isostatic pressing operation, and has a functional surface with a profile bearing percentage of at least 75% and a mean roughness Ra in the range of from 0.01 to 0.1 $\mu$m.

9. The sanitary mixing faucet of claim 8 wherein the mean roughness Ra is in the range of from 0.05 to 0.1 $\mu$m.

10. The sanitary mixing faucet of claim 8 wherein each of the sealing disks has a bearing surface percentage of up to 95%.

11. The sanitary mixing faucet of claim 8 wherein no grease is applied to the functional surfaces of the sealing disks in engagement with one another.

12. The sanitary mixing faucet of claim 8 wherein each of the sealing disks is of a silicon carbide ceramic having a Vickers Hardness less than 2,800 (HV 0.5; DIN 50 133).

13. The sanitary mixing faucet of claim 8 wherein the functional surface with a profile bearing percentage of at least 75% is established by at lease one of grinding, lapping or polishing.

14. The sanitary mixing faucet of claim 8 wherein the sealing disks have a different density from each other.

* * * * *